United States Patent Office 3,010,890
Patented Nov. 28, 1961

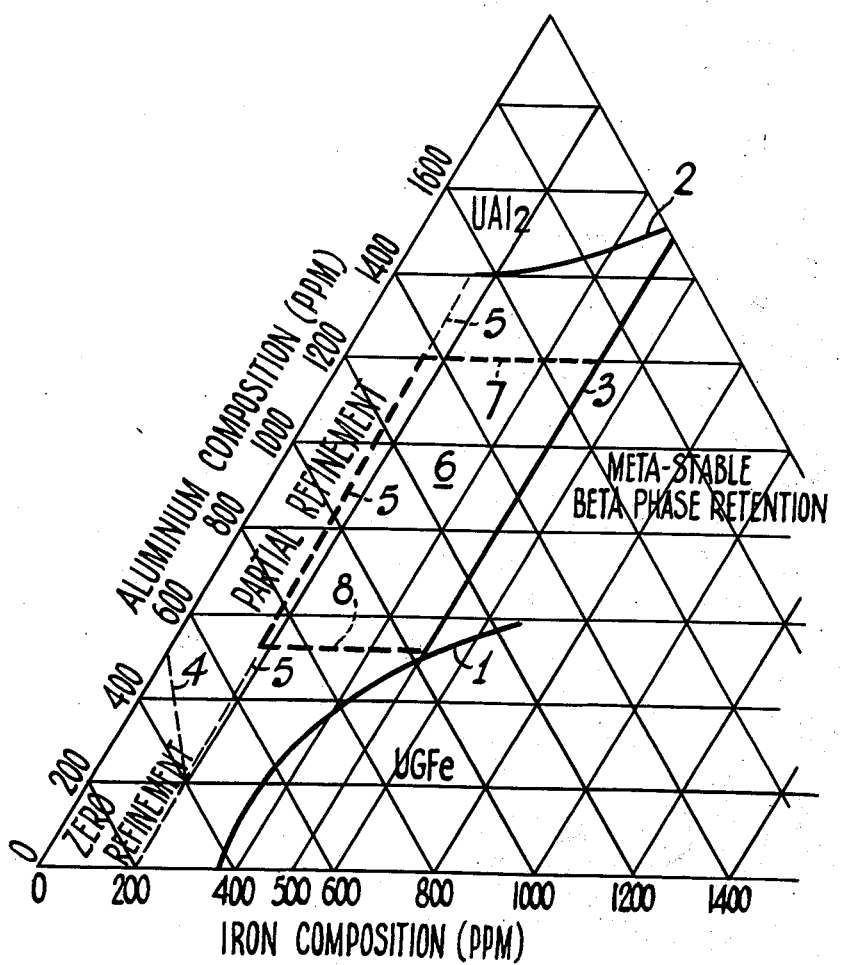

3,010,890
PRODUCTION OF URANIUM METAL
Malcolm Douglas Jepson, Culcheth, Warrington, and Gerard Slattery, Lea, Preston, England, assignors to United Kingdom Atomic Energy Authority, London, England
Filed July 6, 1959, Ser. No. 825,006
Claims priority, application Great Britain July 11, 1958
3 Claims. (Cl. 204—193.2)

This invention relates to the production of uranium metal and it is concerned with producing uranium metal suitable for fabrication as fuel elements for use in nuclear reactors.

British Patent 780,974 discloses a process of producing uranium billets by reducing uranium tetrafluoride with magnesium. The billets are subsequently vacuum cast into moulds to produce bars of uranium and the bars are machined to size, and enclosed in protective sheaths to make fuel elements.

It has been found that such fuel elements suffer from the defect of marked growth in the surface grains under irradiation such that the surfaces of the elements become roughened and wrinkled. Normal heat treatments, such as quenching from the beta phase, to refine the grain before irradiation are not completely satisfactory.

It is an object of the present invention to treat uranium to render it adaptable to grain refinement by heat treatment to a degree that its surface will not roughen unduly under irradiation and to this end it has been found that quite small (measured in parts per million) additions of iron and aluminium have the desired effect.

The invention accordingly resides in the treatment of uranium metal to bring the iron and aluminium contents into the range of 200 to 500 p.p.m. and 500 to 1200 p.p.m. respectively.

The invention will now be further described with reference to the attached ternary diagram and the example given below.

In the diagram, the units of the axes being stated, three boundaries are obtained respectively numbered 1, 2 and 3. Below the boundary 1, primary $U_6Fe$ is present which embrittles the uranium and above the boundary 2, $UAl_2$ is produced which is also unsatisfactory. To the right of boundary 3, meta-stable beta-phase is retained by quenching.

Two dotted lines 4 and 5 are shown which indicate boundaries of zero refinement, and partial refinement. The area between line 5 and boundaries 1, 2 and 3 is an area in which suitable grain refinement can be usefully carried out and the box 6 defined by lines 3, 5, 7 and 8 shows the area of reasonable process limits within the area of refinement.

In carrying the invention into effect a magnesium reduced uranium billet is placed in a graphite crucible with aluminium in the form of 3% master alloy and iron in the form of strip and the whole melted by H.F. induction heating under vacuum. The melt is then poured whilst still under vacuum into alumina lined steel moulds and allowed to cool. The steel moulds produce bars which are one inch in diameter and four feet in length. The bars are then fed vertically by guide rollers through an H.F. heating coil so that their surfaces reach a temperature of 720° C. and then through a sheet of water derived from a pressure feed to an annular slot or series of discrete jets directed to cause the water to impinge all around the rod surface. To avoid "end effects" and consequent uneven heating the bars are fed through the heating and quenching process in end contact with one another.

After quenching the rod is suspended freely from one end in argon under a slight pressure and maintained at 500° C. for an hour to anneal the bar. It has been found that uranium bars made as described above will have a peripheral grain structure refined by a factor of 6 to 30 from the largest initial grain size of about 2.0 to 3.0 mm. The peripheral grain refinement region should extend inwards to a depth of about 6 mm. towards a core which may be less refined than the periphery.

The quenching of the uranium bar has been stated above to take place at 720° C. This is the preferred temperature but other temperatures could be employed, the criterion being that the quenching should take place from a temperature not lower than that at which the iron and aluminium go into solution in the uranium. Similarly the annealing can take place in a range of temperatures 500° C. to 600° C. and over a range of times of one hour to 48 hours.

We claim:
1. An alloy essentially containing uranium, two hundred to five hundred parts per million of iron, and five hundred to twelve hundred parts per million of aluminum.
2. A process comprising making an article from the alloy of claim 1, such article having its initial largest peripheral grain size in the range from two to three millimeters, beta quenching and then alpha annealing said article to refine the peripheral grain size by a factor of six to thirty from said largest initial peripheral grain size.
3. The process of claim 2 wherein said article is a fuel element for a nuclear reactor.

References Cited in the file of this patent
UNITED STATES PATENTS
2,886,430    Allen et al. _____ May 12, 1959